Sept. 21, 1943.  O. HORNE  2,329,903
CONSTANT VELOCITY UNIVERSAL JOINT
Filed July 17, 1941   2 Sheets-Sheet 1
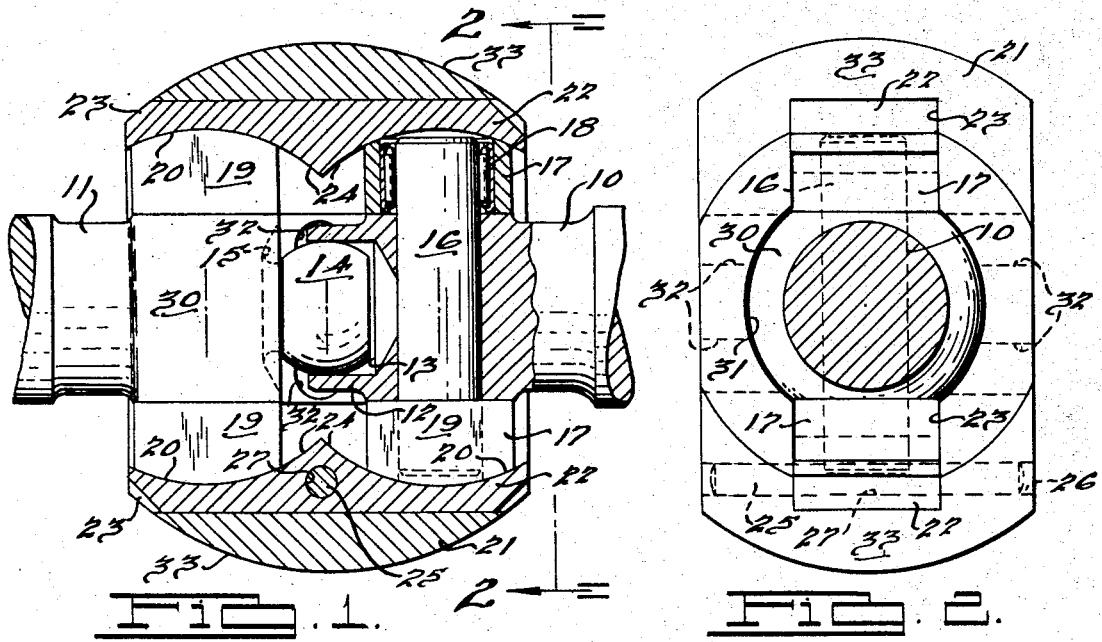
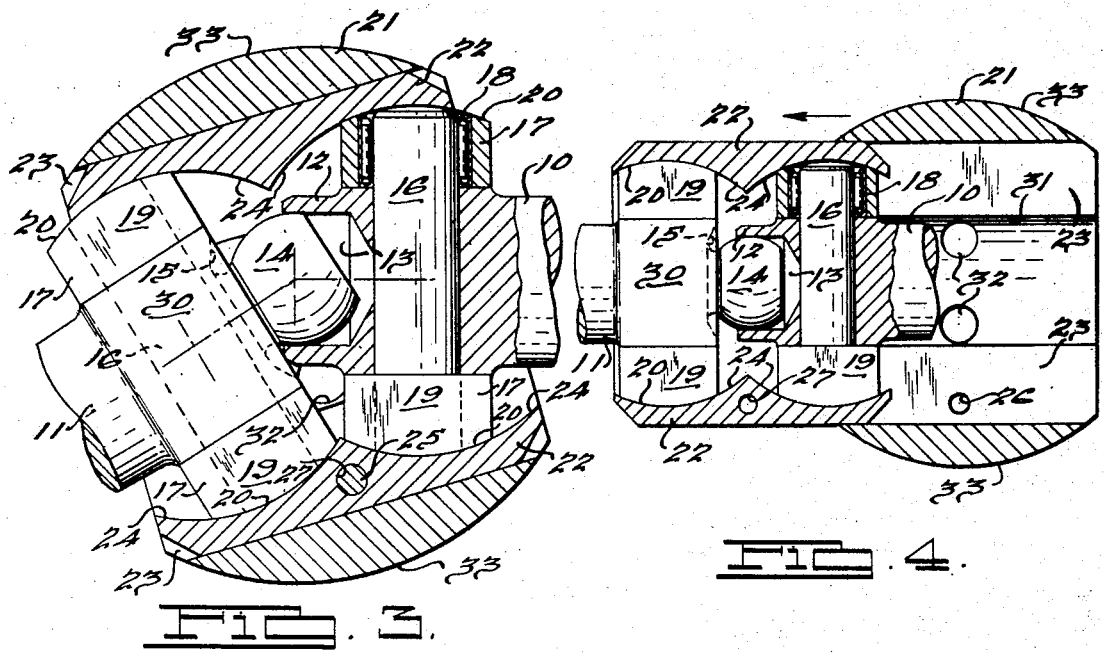
INVENTOR
OLAF HORNE
BY
ATTORNEYS.

Sept. 21, 1943.  O. HORNE  2,329,903
CONSTANT VELOCITY UNIVERSAL JOINT
Filed July 17, 1941  2 Sheets-Sheet 2

INVENTOR
OLAF HORNE
BY
ATTORNEYS

Patented Sept. 21, 1943

2,329,903

UNITED STATES PATENT OFFICE 2,329,903

CONSTANT VELOCITY UNIVERSAL JOINT

Olaf Horne, Pleasant Ridge, Mich., assignor to Chrysler Corporation, Highland Park, Mich., a corporation of Delaware Application July 17, 1941, Serial No. 402,737

6 Claims. (Cl. 64—21)

The present invention relates to universal joints for connecting pairs of rotating shafts. The object of the invention is to provide a universal joint having constant angular velocity torque transmission characteristics. The purpose of the present invention is to provide means for imparting rotation from one shaft to another at a constant angular velocity in order to eliminate shocks and strains set up in the universal joint, the shafts themselves, or machinery connected to either or both shafts by non-uniform, angular velocity imparted by certain types of universal joints heretofore used. A particularly important use for the present invention is in driving the front wheels of front wheel driven automotive vehicles, the present invention imparting constant angular velocity to the driven wheel to match the constant angular velocity of the rear wheels and thus eliminate strains on the driving mechanism and on the wheels themselves as well as eliminate tire fatigue and wear formerly encountered with the use of certain types of universal joints.

A further object of the present invention is to provide a constant velocity universal joint of rugged construction which may be quickly and easily assembled and which is of relatively simple manufacture, all parts thereof being machined along straight, cylindrical, or spherical elements by machine tools of ordinary construction.

The objects and advantages of the present invention will be more readily understood by reference to the following specification taken in connection with the accompanying drawings wherein like numerals refer to like parts throughout.

In the drawings,

Fig. 1 is a central section taken through a universal joint embodying my present invention showing the joint in the position assumed when the shafts are in line with each other;

Fig. 2 is an end view of the joint taken substantially along line 2—2 of Fig. 1, looking in the direction of the arrows;

Fig. 3 is a view similar to Fig. 1 showing the position of the parts when the driven and driving shafts are at an angle with respect to each other;

Fig. 4 is a sectional view showing the method of assembly of the parts to form the universal joint;

Figures 5, 6:
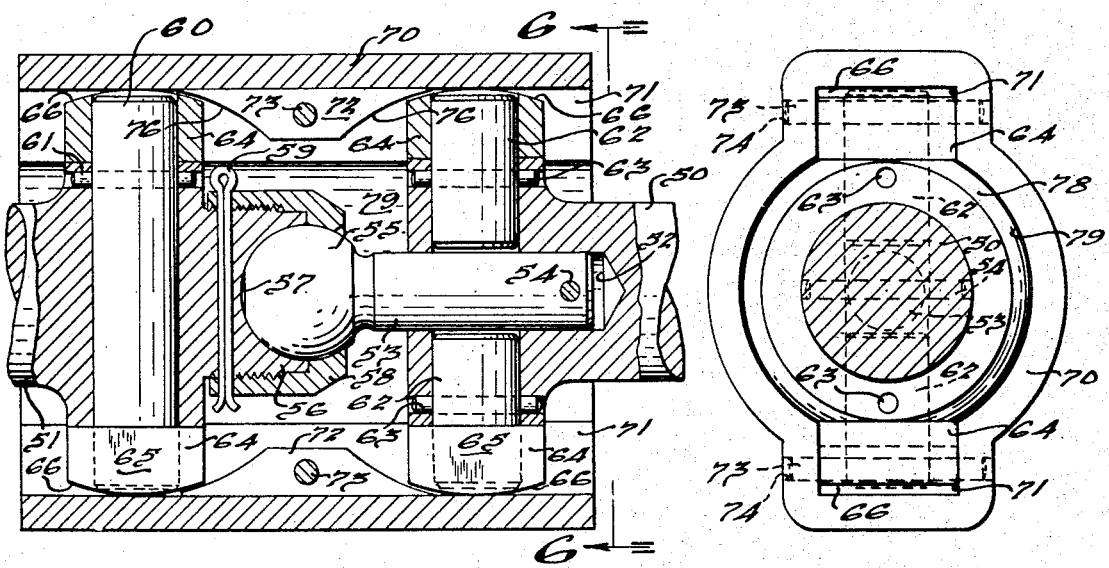
Fig. 5 is a central sectional view through a modified form of universal joint embodying the present invention.
Fig. 6 is an end view of the joint shown in Fig. 5 taken substantially along line 6—6 of Fig. 5 and looking in the direction of the arrows.

Figs. 1 to 4, inclusive, show a joint which is of particular utility as a constant velocity universal joint for connecting the driving mechanism to the wheels of a front wheel driven automotive vehicle. The joint connects a pair of shafts 10 and 11, one of which is a driven shaft and the other of which is a driving shaft, preferably in the order named. The driven shaft 10 is provided at its end with a longitudinally extending flange 12 surrounding a centrally located, longitudinally extending socket 13, and the driven shaft 11 is provided at its end with a centrally located, longitudinally extending, spherical ball 14 of slightly lesser diameter than the socket 13, the end of the shaft surrounding the ball being preferably recessed as indicated at 15 in order that the flange 12 may not interfere with relative angular movement of the shafts 10 and 11 when the ball 14 is placed in the socket 13.

Adjacent the end of each shaft there is provided a trunnion bearing within which are mounted trunnion shafts 16, the axes of the trunnion shafts being normal to and intersecting the longitudinal axes of the shafts in which they are placed. Each of the trunnion shafts 16 is of sufficient length to have ends protruding beyond the surface of the main shaft with which it is associated, and the ends thereof are of sufficient length to support a pair of trunnion blocks 17 rotatively mounted thereon. The bore in the trunnion block 17 is preferably of sufficient diameter to receive a roller bearing 18 providing free relative turning between the shaft 16 and the trunnion block 17. The trunnion blocks are provided with a pair of parallel side faces 19 and each trunnion block has its end face machined on a cylindrical plane whose axis of revolution is normal to the axis of the trunnion shaft and passes through the intersection of the trunnion shaft and the main shaft, thus providing cylindrically curved end faces 20 having centers of revolution passing through the center of revolution of the main shaft about the trunnion shaft.

The parts are held in assembled relation by a torque transmitting sleeve 21 and locking members 22 adapted to be associated with the torque transmitting sleeve by the following means. The sleeve 21 is provided with a pair of diametrically opposed, longitudinally extending splines 23, the parallel faces of which are spaced slightly greater than the width of the trunnion block between the parallel side faces 19 so that the shafts with the trunnion blocks associated therewith can be slid longitudinally into the torque transmitting sleeve. Before associating the shafts and sleeve the locking members 22 are placed on both ends of the trunnion shafts when in assembled and aligned relation as shown in Fig. 4. Each of the locking pieces 22 is provided with a pair of cylindrical surfaces of revolution 24, the radii of which are substantially equal to and coincide with the radii of the surfaces 20 of the bearing blocks 17 when the shafts are in proper assembled relationship to each other, thus to provide bearing surfaces against which the ends of the trunnion blocks may slide. Each surface 24 is preferably of sufficient extent to provide substantial bearing surface for the associated trunnion block even when the universal joint is at its greatest angle as shown in Fig. 3, the locking members therefor also serving to prevent substantial relative longitudinal displacement of the parts of the assembly. After the parts are assembled the assembly may be locked together by passing a pin 25 through a bore 26 in the torque transmitting sleeve and a matching bore 27 in one of the locking members 22. Preferably, the other locking member is left free to assume a substantially identical position in the opposite spline 23 in order that it may adjust itself to manufacturing inequalities or unequal wear.

Preferably, each main shaft 10 and 11 is provided with a spherical surface 30 generated about the intersection of the axes of the main shaft and the trunnion shaft, the spherical surface 30 being cut off parallel opposed planes to provide flat seats for the trunnion blocks 17. The torque transmitting sleeve is provided with a cylindrical, longitudinal bore 31 of slightly larger diameter than the diameter of the spehrical surfaces 30 so as to provide means for relieving the trunnion blocks of the work of centering the shafts in the torque transmitting sleeve at the various angular positions. The torque transmitting sleeve may be provided with a plurality of lubricant transmitting openings 32 extending into the center of the bore 31 from the side surfaces of the sleeve so as to provide means for lubricating the various parts when in assembled relation. The sleeve itself may be provided with external spherical surfaces 33 adapted to rest in a socket holder (not shown), which might also act as a reservoir for lubricant.

The complementary ball and socket joint forming means provided at the ends of shafts 10 and 11 are of the open socket type permitting longitudinal displacement of the shafts, such displacement beyond a limited extent being prevented by the locking members 22. The limited displacement in this form of joint occurs when the main shafts are displaced angularly with respect to each other, in which case the distance between the intersections of the axes of the trunnion shafts and the main shafts must remain constant since the trunnion blocks slide in the cylindrical surfaces 24 whose centers remain constantly spaced. Thus the center of revolution of the ball 14 moves outwardly of the socket 13 a slight distance when the shafts are angularly displaced, the open character of the socket joint thus permitting such displacement without substantially affecting the performance of the joint. The slight irregularities in angular velocity between the driven and driving shafts introduced is of such slight value that the joint is for all practical purposes a constant velocity joint.

Figure 7:
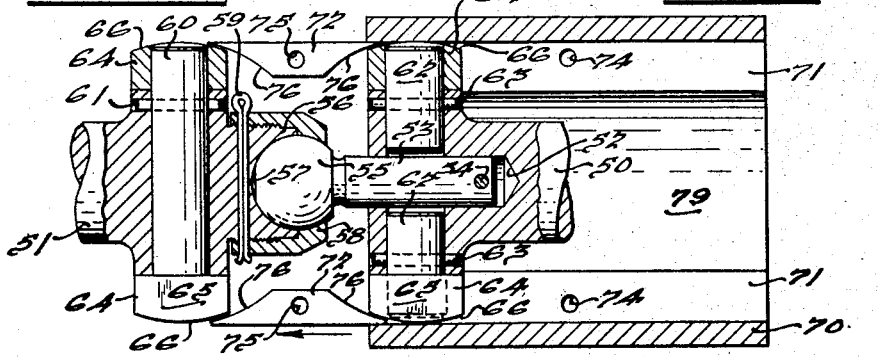
Fig. 7 is a central sectional view showing the method of assembly of the joint; and, Fig. 8 is a view similar to Fig. 5 showing the position of the parts when the driven and driving shafts are at an angle with respect to each other.
Figure 8:
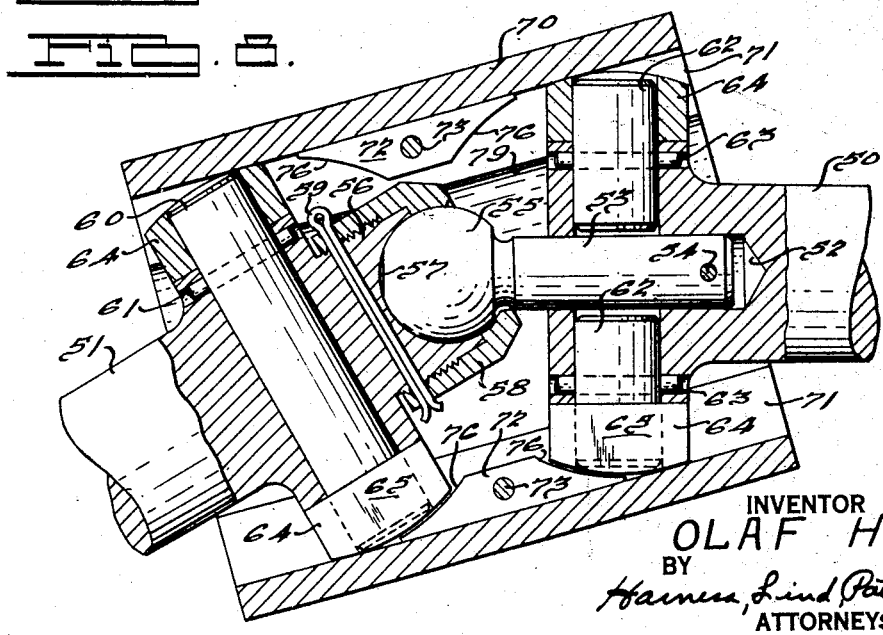

The form of joint shown in Figs. 5 to 8, inclusive, comprises substantially the same features as those previously disclosed, only in this case certain parts are modified for various reasons and the joint is so formed as to maintain the ball and socket joint in fixed relative position while permitting relative movement between the points of intersection of the axes of the trunnion shafts and the main shafts when the main shafts are angularly displaced. In the form of the invention, the center of the ball head 55 is accurately maintained at an equal distance from the axes of both trunnion shafts of the joint regardless of the relative angularity of the main shaft sections and therefore, constant velocity characteristics are maintained theoretically accurate.

In this form of the invention the main shafts 50 and 51 are provided with complementary means forming a locked ball and socket joint. For manufacturing simplicity the shaft 50 is provided with a longitudinally extending bore 52 within which is fitted a pin 53 locked in position by a cross pin 54, the pin 53 having a ball head 55. The shaft 51 is provided with a longitudinally extending, threaded extension 56 having a centrally located, spherical socket 57 adapted to receive the ball head 55. A locking piece 58 is threaded onto the extension 56 and maintained in position by a cotter pin 59, the piece being so formed as to continue the spherical cavity provided by the socket 57 beyond a hemisphere so as to hold the ball head 55 seated in the cavity 57.

The shafts 50 and 51 are provided adjacent their ends with trunnion bearings whose axes are normal to and intersect the axes of the main shafts, the trunnion bearings receiving trunnion shafts adapted to provide ends extending beyond the main shafts. The shaft 51 may be provided with a single trunnion shaft 60 of sufficient length to provide protruding ends, the trunnion shaft being locked in position by a pin 61. In order to accommodate the pin 53 in the bore 52 the shaft 50 is provided with a pair of short trunnion shafts 62 each of which is locked in position by a pin 63. Each protruding end of the trunnion shafts rotatively mounts a trunnion block 64, each of which is provided with a pair of parallel side faces 65 and a cylindrical end face 66 whose axis of revolution passes through the intersection of the trunnion shaft and the main shaft and extends normal to the axes of the trunnion shaft and main shaft.

The shafts are assembled to a torque transmitting sleeve 70 provided with a pair of diametrically opposed, longitudinally extending splines 71 of width to receive and guide the parallel side faces 65 of the trunnion block 64. The parts are locked in assembled relation by locking members 72 adapted to be placed in the splines between the opposed pairs of trunnion blocks and maintained in position by pins 73 passing through openings 74 in the torque transmitting sleeve and openings 75 in the locking members. Each locking member is provided with a pair of curved surfaces 76 whose radii when in assembled position substantially coincide with the radii of the surfaces 66, with sufficient allowance for permitting the shortening of the distance between the intersections of the axes of the main shafts and the trunnion shafts when the main shafts are angularly displaced. In this form of the invention the assembly is prevented from separation by the joint action of the locked form of ball and socket joint and the locking pieces 72 pinned to the torque transmitting sleeve 70. The main shafts are preferably provided with cylindrical surfaces 78 generated about the intersections of the trunnion shafts and the main shafts, diametrically opposed portions thereof being planed off to provide seats for the trunnion blocks 64. The torque transmitting sleeve is also preferably provided with a longitudinally extending cylindrical bore 79 of sufficient diameter to embrace the spherical surfaces 78 and thus relieve the trunnion blocks of some of the work of centering the shafts in the sleeve. The surfaces 78 likewise provide means for holding a quantity of lubricant in the bore surrounding the ball and socket joint.

Having illustrated and described two modifications of the present invention, it should be apparent to those skilled in the art that various modifications in detail and in arrangement of parts may be devised. All such modifications as come within the scope of the following claims are considered to be a part of my invention.

I claim:

1. In a universal joint for shafts capable of relative angular displacement, the combination of a pair of main shafts provided at their ends with complementary relatively axially shiftable means forming a ball and socket pivot for accommodating both axial and pivotal movement therebetween, a trunnion bearing in each main shaft adjacent its end, the axis of said trunnion bearing intersecting and extending normal to the longitudinal axis of the main shaft, trunnion shafts carried in said trunnion bearings and having ends projecting laterally beyond the main shaft, trunnion blocks rotatively mounted on each projecting end of said trunnion shafts, said blocks being provided with parallel side faces and cylindrical end faces whose axes of revolution pass through, and are normal to, the axes of said trunnion shafts and said main shafts at their intersections, and a torque transmitting sleeve provided with a pair of diametrically opposed, longitudinally extending splines whose width is such as slidably to embrace the parallel side faces of said trunnion blocks.

2. In a universal joint for shafts capable of relative angular displacement, the combination of a pair of main shafts provided at their ends with complementary means forming a ball and socket pivot, a trunnion bearing in each main shaft adjacent its end, the axis of said trunnion bearing intersecting and extending normal to the longitudinal axis of the main shaft, trunnion shafts carried in said trunnion bearings and having ends projecting laterally beyond the main shaft, trunnion blocks rotatively mounted on each projecting end of each of said trunnion shafts, said blocks being provided with parallel side faces and cylindrical end faces whose axes of revolution pass through, and are normal to, the axes of said trunnion shafts and said main shafts at their intersections, a torque transmitting sleeve provided with a pair of diametrically opposed, longitudinally extending splines whose width is such as slidably to embrace the parallel side faces of said trunnion blocks, and locking members adapted to be placed in said splines centrally of said torque transmitting sleeve whereby to prevent substantial longitudinal displacement of said torque transmitting member with respect to said main shafts.

3. In a universal joint for shafts capable of relative angular displacement, the combination of a pair of main shafts provided at their ends with complementary means forming a ball and socket pivot, a trunnion bearing in each main shaft adjacent its end, the axis of said trunnion bearing intersecting and extending normal to the longitudinal axis of the main shaft, trunnion shafts carried in said trunnion bearings and having ends projecting laterally beyond the main shaft, trunnion blocks rotatively mounted on each projecting end of each of said trunnion shafts, said blocks being provided with parallel side faces and cylindrical end faces whose axes of revolution pass through, and are normal to, the axes of said trunnion shafts and said main shafts at their intersections, a torque transmitting sleeve provided with a pair of diametrically opposed, longitudinally extending splines whose width is such as slidably to embrace the parallel side faces of said trunnion blocks, and locking members adapted to be placed in said splines centrally of said torque transmitting sleeve whereby to prevent substantial longitudinal displacement of said torque transmitting sleeve with respect to said main shafts, said locking members having cylindrical faces whose axes of revolution are substantially the same as the axes of revolution of the cylindrical faces of said trunnion blocks and whose radii are substantially the same as the radii of the cylindrical faces of said trunnion blocks in order to center the main shafts in the torque transmitting sleeve at any angular displacement of the main shafts.

4. In a universal joint for shafts capable of relative angular displacement, the combination of a pair of main shafts provided at their ends with complementary means forming a ball and socket pivot, a trunnion bearing in each main shaft adjacent its end, the axis of said trunnion bearing intersecting and extending normal to the longitudinal axis of the main shaft, trunnion shafts carried in said trunnion bearings and having ends projecting laterally beyond the main shaft, trunnion blocks rotatively mounted on each projecting end of each of said trunnion shafts, said blocks being provided with parallel side faces and cylindrical end faces whose axes of revolution pass through, and are normal to, the axes of said trunnion shafts and said main shafts at their intersections, a torque transmitting sleeve provided with a pair of diametrically opposed, longitudinally extending splines whose width is such as slidably to embrace the parallel side faces of said trunnion blocks, and locking members adapted to be placed in said splines centrally of said torque transmitting sleeve whereby to prevent substantial longitudinal displacement of said torque transmitting sleeve with respect to said main shafts, said locking members having cylindrical faces whose axes of revolution are substantially the same as the axes of revolution of the cylindrical faces of said trunnion blocks and whose radii are substantially the same as the radii of the cylindrical faces of said trunnion blocks in order to center the main shafts in the torque transmitting sleeve at any angular displacement of the main shafts, said ball and socket joint being of the open type permitting separation of the ends of said main shafts and the cylindrical faces of said locking members being of such extent as to permit separation of the ends of said main shafts while holding the intersections of said axes of revolution in fixed relative position at any angular displacement of said main shafts with respect to each other.

5. In a universal joint for shafts capable of relative angular displacement, the combination of a pair of main shafts provided at their ends with complementary means forming a ball and socket pivot, a trunnion bearing in each main shaft adjacent its end, the axis of said trunnion bearing intersecting and extending normal to the longitudinal axis of the main shaft, trunnion shafts carried in said trunnion bearings and having ends projecting laterally beyond the main shaft, trunnion blocks rotatively mounted on each projecting end of each of said trunnion shafts, said blocks being provided with parallel side faces and cylindrical end faces whose axes of revolution pass through, and are normal to, the axes of said trunnion shafts and said main shafts at their intersections, a torque transmitting sleeve provided with a pair of diametrically opposed, longitudinally extending splines whose width is such as slidably to embrace the parallel side faces of said trunnion blocks, and locking members adapted to be placed in said splines centrally of said torque transmitting sleeve whereby to prevent substantial longitudinal displacement of said torque transmitting sleeve with respect to said main shafts, said locking members having cylindrical faces whose axes of revolution are substantially the same as the axes of revolution of the cylindrical faces of said trunnion blocks and whose radii are substantially the same as the radii of the cylindrical faces of said trunnion blocks in order to center the main shafts in the torque transmitting sleeve at any angular displacement of the main shafts, one only of said locking members being fixedly fastened to said torque transmitting member whereby the other of said locking members may adjust itself longitudinally of the spline in which it is seated as angular shifting of said main shafts may occur.

6. In a universal joint for shafts capable of relative angular displacement, the combination of a pair of main shafts provided at their ends with complementary relatively axially shiftable means forming a ball and socket pivot for accommodating relative pivotal and axial movement between said shafts, a trunnion bearing in each main shaft adjacent its end, the axis of said trunnion bearing intersecting and extending normal to the longitudinal axis of the main shaft, trunnion shafts carried in said trunnion bearings and having ends projecting laterally beyond the main shaft, trunnion blocks rotatively mounted on each projecting end of each of said trunnion shafts, said blocks being provided with parallel side faces and cylindrical end faces whose axes of revolution pass through, and are normal to, the axes of said trunnion shafts and said main shafts at their intersections, and a torque transmitting sleeve provided with a longitudinal central bore adapted to receive the ends of said main shafts and a pair of diametrically opposed, longitudinally extending splines adapted to receive said trunnion blocks, the ends of said main shafts being provided with spherical surfaces whose centers of revolution coincide with the intersections of the axes of said main shafts and said trunnion shafts and whose radii are slightly less than the radius of said bore whereby said spherical surfaces center the intersections of said main shafts and said trunnion shafts in said bore at any angular displacement of said main shafts.

OLAF HORNE.

CERTIFICATE OF CORRECTION.

Patent No. 2,329,903.  September 21, 1943.

OLAF HORNE.

It is hereby certified that error appears in the printed specification of the above numbered patent requiring correction as follows: Page 2, first column, line 38, after "off" insert --along--; and that the said Letters Patent should be read with this correction therein that the same may conform to the record of the case in the Patent Office.

Signed and sealed this 11th day of April, A. D. 1944.

(Seal)

Leslie Frazer

Acting Commissioner of Patents.